Dec. 24, 1968  F. F. DE SMEDT ETAL  3,417,430
SCREW ADJUSTMENT MECHANISM
Filed Aug. 10, 1966  2 Sheets-Sheet 1
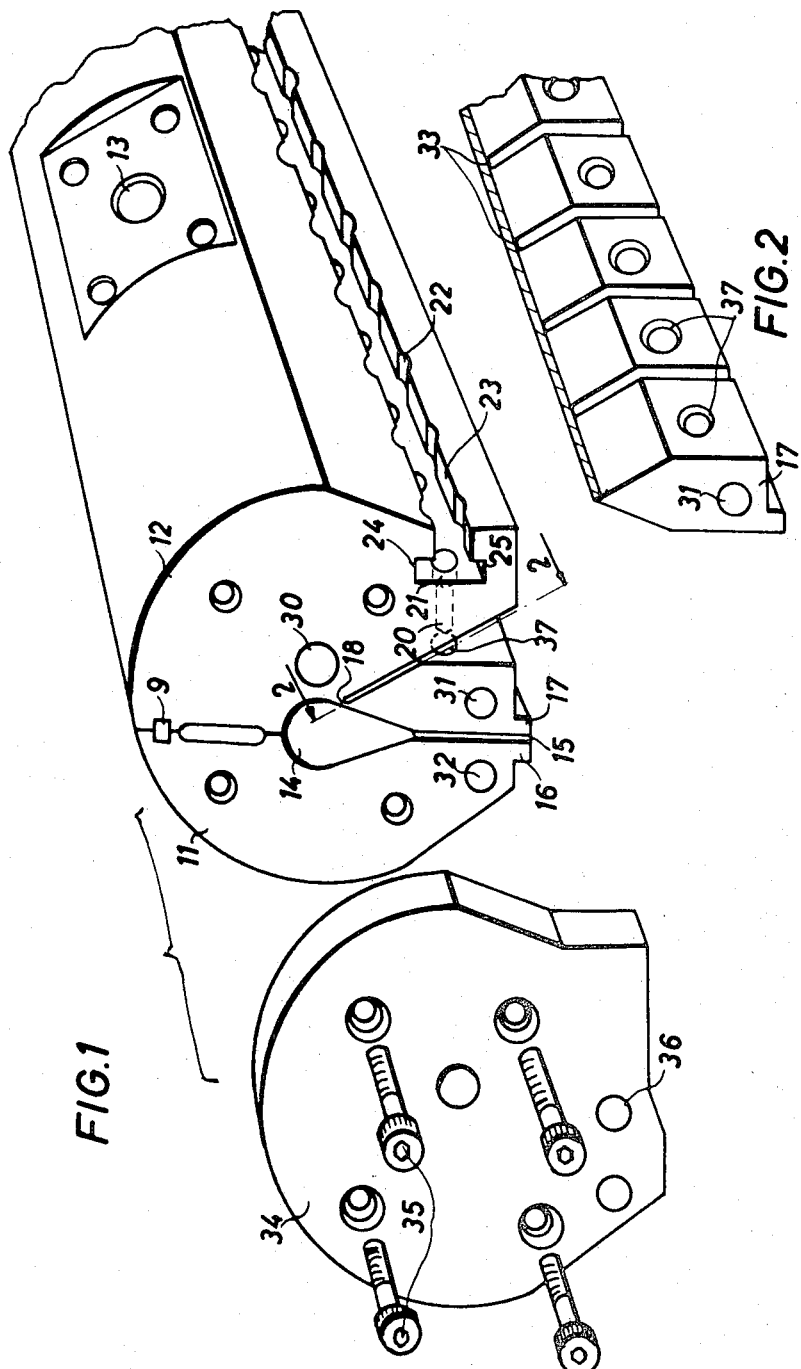
INVENTOR
Felix Frederik De Smedt
& Victor Aloïs Marinus
BY Watson, Cole, Grindle & Watson Dec. 24, 1968    F. F. DE SMEDT ETAL    3,417,430
SCREW ADJUSTMENT MECHANISM
Filed Aug. 10, 1966    2 Sheets-Sheet 2

United States Patent Office 3,417,430
Patented Dec. 24, 1968

3,417,430
SCREW ADJUSTMENT MECHANISM
Felix Frederik De Smedt and Victor Alois Marinus,
Wilrijk-Antwerp, Belgium, assignors to Gevaert-
Agfa, N.V., Mortsel, Belgium, a Belgian company
Filed Aug. 10, 1966, Ser. No. 571,567
Claims priority, application Great Britain, Aug. 10, 1965,
34,209/65
2 Claims. (Cl. 18—12)

ABSTRACT OF THE DISCLOSURE

A slit type extrusion head in which a longitudinal section of the head defining one wall of the slit is connected to the remainder of the head through a thin neck and is subdivided longitudinally by weakened regions so that the section can be adjusted bodily relative to the remainder of the head, and the independent longitudinal subdivisions adjust with respect to each other, the head being equipped with an adjusting mechanism comprised of a plurality of screws seated in the head portion and in threadwise engagement with the longitudinal section, substantially every subdivision of the section having one of said screws engaged therewith, the heads of the screws being received in recesses provided therefor and restrained against displacement relative to such recesses by a retaining bar common to all of the screws, the bar having openings aligned with the screw heads to permit access to such heads for adjustment of the screws.

---

The present invention relates to an adjustment mechanism, and more particularly to a mechanism especially adapted for the precise adjustment of the orifice lips of film extrusion apparatus.

The employment of adjustment mechanisms is indispensable to numerous mechanical processes and apparatus. Important applications of precision adjustment devices may be found in the adjustment of slot widths in flat film extrusion dies, and in the adjustment of the distance between nips of doctor rolls used in such applications as the coating of polymeric films.

The existing adjustment mechanisms suffer from several disadvantages. First, relative complicate means such as studs with two nuts for engaging at either side a clamped member, see e.g. U.S. patent specification 3,102,302, adjusting nuts carrying a threaded skirt, see e.g. U.S. patent specification 3,039,143, must be provided for both pulling and pushing the adjustable member. Second, in case one or more support members are used for supporting the adjustment screws, the bolts for fixing such members to the body of the die may prevent a close spacing of the adjustment screws. Third, the additional parts of the adjustment mechanism such as the threaded skirt, the separate support members, etc., may prevent the proper location of band-type heaters around the extrusion die.

The object of the invention is to provide an improved mechanism for the adjustment of mechanical elements.

A more specific object is to provide an adjustment mechanism of simple construction for use in flat film extrusion dies, in which mechanism the adjustment screws may be closely spaced, and may even be located closely to the lateral extremities of the extrusion die.

According to the present invention, adjustment mechanism for relatively displacing two members or two parts of a common member comprises a screw-threaded bore or socket in one member or part, an aligned bore which extends through the other member or part and is enlarged over one end portion of the bore length for accommodating a bolt or screw head while providing an internal shoulder against which such head can thrust, a bolt or screw of which the shank is in screw-threaded engagement with said bore or socket in said one member or part but extends through without threaded engagement with the narrower part of the bore in said other member or part, the head of such bolt or screw being accommodated in said bore enlargement, and bolt or screw retaining means fitted to said other member or part and intruding into said bore enlargement, so as by abutment against the top of the bolt or screw head to prevent axial displacement of the bolt or screw relative to said other member or part when the bolt or screw is turned, but without preventing introduction of a tool into the said bore enlargement for effecting such turning of the bolt or screw.

The said retaining means may be and preferably is a part having an opening therein large enough to pass the end of a tool for engaging the head of the bolt or screw. Such a retaining means may be slidable into operative position along a guideway running normally to the bolt or screw axis and opening into the said bore enlargement so that the retaining means does not project from the entrance to such bore enlargement.

The bolt or screw is preferably a socket head bolt.

As the invention is particularly intended for use in flat film extrusion apparatus, reference is particularly made to such apparatus in this specification but it is to be understood that the invention may be applied to any situation where a simple adjustment mechanism, capable of performing a pulling and a pushing movement, is deemed necessary.

By the term "lip member" as will be used hereinafter in connection with extrusion dies, is not only meant lips which are constituted by square or rectangular bars located against the elongate outlet opening of the manifold of a die and at least one of them being arranged for displacement towards and away from the other, but also lips which are formed by the extremities of the walls defining the manifold, at least one of said walls having a longitudinal region of locally weakened cross-section so as to permit a limited displacement of its extremity in respect of the extremity of the other wall.

The invention will hereinafter be described by way of example in connection with the accompanying drawings in which:

FIG. 1 is a partial perspective view of a typical extrusion die which is provided with the adjustment mechanism according to the invention.

FIG. 2 is a cross-sectional view of the adjustable lip member on line 2—2 of FIG. 1.

Figure 3:
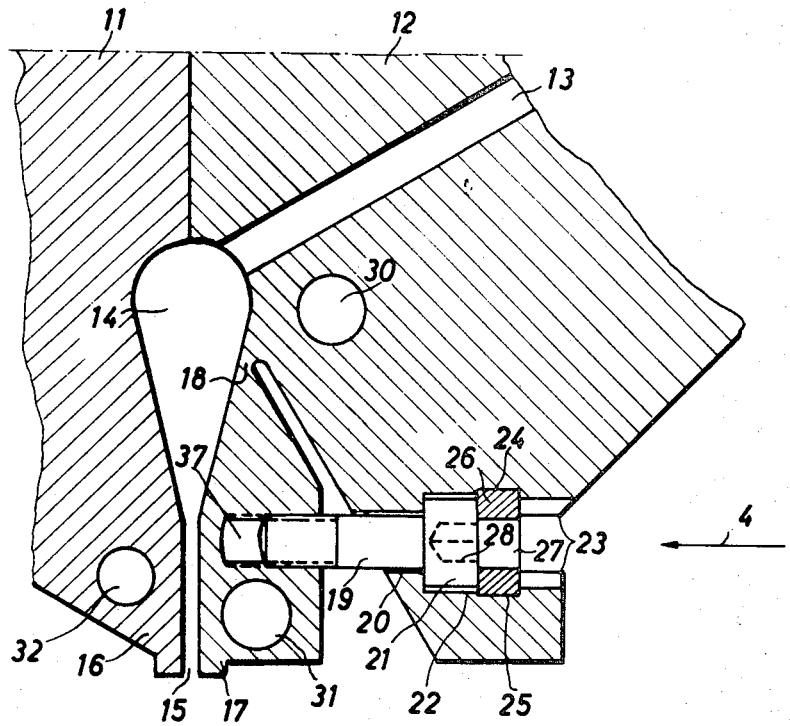
FIG. 3 is a cross-sectional view of the extension die through one adjustment screw.

In FIG. 1 a partial perspective view of an extrusion die is shown, one end plate being removed for clearness sake.

The die is composed of the part 11 and the part 12. Both parts are secured in exact mutual relationship by means of the bar 9 which is located in corresponding grooves, and they are fitted together by means of a plurality of bolts (not shown) ranged beside each other in the longitudinal direction of the die. The part 12 is provided with a channel 13 through which the extrusion composition from a screw press of known construction is fed to the die. The channel 13 flares out into the center of the teardrop manifold 14. The extrusion orifice 15, communicating with the manifold 14, is formed by the lip members 16 and 17. In the present die, said lip members are the extremities of the parts 11 and 12. The lip member 17 is made adjustable by providing the part 12 with a longitudinal region of locally weakened cross-section 18 and with transverse regions of weakened cross-section 33. Channels 30, 31, 32 are provided through which electrical cartridge heaters may be inserted for controlling the temperature of the die.

At either side, the die is provided with an end plate 34 which is fitted to the parts 11, 12 with bolts 35. The adjustable lip member 17 is not fixed at its end to the end plates 34. The clearance of the cartridge heater which passes through the opening 36 in the end plate 34 and the channel 31 into the adjustable lip member 17 is sufficiently great to permit limited displacement of the lip member.

The adjustment of the lip member 17 is controlled by a plurality of adjustment socket-head screws 19 (FIG. 3). The screws have a threaded end portion which threadably engages the lip member 17 in the openings 37. The non-threaded portion of the screws is passed through the first cylindrical openings 20 in the part 12, which have a diameter which is some mm. greater than the diameter of the screw body. The heads 21 of the screws are countersunk in the second openings 22 which have a diameter which is likewise some mm. greater than the diameter of the screw heads and which are axially aligned with the first openings 20. The underside of the heads of the screws 19 lies flush against the flat rim of the bottom of the opening 22.

In the part 12 further a recess 23 has been machined the longitudinal axis of which intersects the axis of the openings 22, and in the opposite side walls of which the grooves 24, 25 have been milled.

Figure 4:
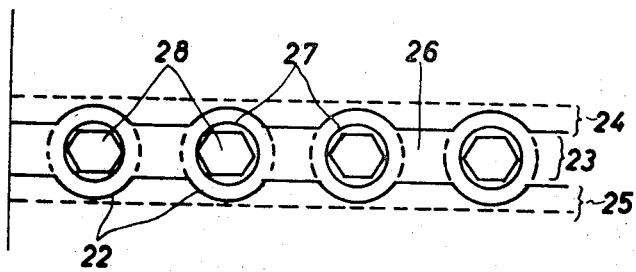
FIG. 4 is a partial front view according to the arrow 4 of the arrangement of FIG. 3.

A metal bar 26, see FIGS. 3 and 4, which is provided with a plurality of circular openings 27 is introduced, at one end of the die in the grooves 24 and 25 and laterally slid in front of the adjustment screws 19. The location of the openings 27 of the bar 26 corresponds with the location of the screws 19, and they let the hexagon sockets 28 exposed for the introduction of a hexagon wrench key through the openings 27 in the sockets 28 in order to adjust the screws.

A turning to the right of an adjustment screw will exert a pulling force on the lip member 17 and tend to locally increase the width of the orifice 15. The effect extends substantially over the portion of the lip member comprised between the two portions of reduced section 33 at either side of the adjustment screw, but it is clear that this effect is not discontinuous and extends over some further distance. A turning to the left of an adjustment screw will exert a pushing force on the lip member 17 and will tend to decrease the width of the orifice. When pulling, the screw head 21 seats against the bottom rim of the opening 22. When pushing, the screw head is withheld by the retaining bar 26.

Setting the adjustment screws of the die to give uniform thickness is a matter of getting the feel of the die. An operator must learn just how much each screw must turn for a given thickness change. Markings on the screw can be added to serve as a rough guide, but final adjustment is still a matter of skill.

Besides the heating cartridge inserted in the channels 31, 32 and 33 of the die body, also critical band-type heaters are provided (not shown) at the external side of the die for controlling the die temperature. The adjustment mechanism being located well within the periphery of the die, it is clear that the location of the external heaters is in no way hindered, and that the heaters may extend from the lip member 16, over the die body, up to the longitudinal recess 23.

The securing of the bar 26 against lateral displacement occurs by means of its lateral ends which lie flush against the end plates 34. Since in this way no particular means such as lock screws or the like need be provided near the ends of the bar for securing its location, it is clear that the adjustment screws 19 may be provided close to the end of the bar so that the adjusting extends practically even up to the edges of the extrusion orifice, exactly the area where adjusting is most required.

The application of the adjustment mechanism in an extrusion die is not limited to the described embodiment. Thus, the adjustment mechanism may for instance be used in an extrusion die in which the non-threaded portion of the adjustment screws is engaged by an adjustable lip member and wherein the threaded portion of the said screws engages a fixed body part of the die. A representation of a die of the described type is found, among others, in U.S. patent specification 2,998,624.

The adjustment mechanism may also be used in extrusion dies, wherein the extrusion orifice is formed by separate lips which are bolted to the body member of the die in which the manifold is formed.

The die may be further provided by other means for controlling the thickness of the extruded film. In a known way, such means may comprise an adjustable choker bar, which is a relatively thin metal bar running across the die and which can be flexed by a plurality of bolts connecting it with the die body. It sets in a special groove and acts as a sort of valve. The adjustment of the choker bar may even be performed by means of an adjustment mechanism according to the present invention.

What we claim is:

1. An improved slit type extrusion head for extruding a sheet of thermoplastic material comprising first and second co-operating segments adapted to be attached together to define an enclosed manifold for receiving the material to be extruded, and a generally radially extending slit communicating between said manifold and the outside atmosphere, said slit being formed by co-operating, spaced parallel walls provided on the respective segments, said first segment having a substantially wedge-shaped sub-segment which is adjacent to said slit and carries the slit-forming wall of said segment, said sub-segment being separated from the remainder of said first segment except immediately proximate said manifold whereby said sub-segment can be adjusted bodily angularly relative to the remainder of its segment to adjust the width of said slit, said sub-segment being divided at spaced longitudinal points by transverse regions of weakened cross-section, whereby said longitudinal divisions are adapted to flex relative to one another, and an adjustment mechanism comprising a plurality of parallel closely spaced adjusting socket screws arranged longitudinally of said head, said screws having thread-free outer portions extending through apertures formed in said first segment proximate said sub-segment and threaded inner portions in threadwise engagement with threaded recesses substantially every division of said sub-segment having a recess engaged by one of said screws in said sub-segment, the axes of said screws lying in plane transverse to said manifold axis, the non-threaded portions of the screws being secured against axial displacement with respect to the segment portion through which they are passed, by countersinking the heads of the screws in said portion, and by providing a retaining bar over the heads of the screws which fits into at least one longitudinal groove which is provided in the said portion in front of the location taken by the heads of the screws and which retaining bar shows a plurality of openings which partly expose the heads of the screws and permit the introduction of a tool into the sockets of the screws for the adjustment of the screws.

2. An adjustment mechanism according to claim 1, in which hexagon socket adjusting screws are used, and the retaining bar is provided with circular openings that are axially aligned with said adjustment screws and the diameter of which is slightly greater than the greatest diameter of the hexagon socket.

References Cited

UNITED STATES PATENTS

| | | |
|---|---|---|
| 1,574,330 | 2/1926 | Wilkinson. |
| 2,148,003 | 2/1939 | Wurtzel _____ 18—12 XR |
| 2,718,155 | 9/1955 | Firth. |
| 2,975,475 | 3/1961 | Heston. |
| 3,096,543 | 7/1963 | Konopacke et al. _____ 18—12 |
| 3,109,663 | 11/1963 | Phillips _____ 151—69 XR |
| 3,112,527 | 12/1963 | Pankratz et al. _____ 18—12 |
| 3,264,686 | 8/1966 | Soloduk _____ 18—12 |

WILLIAM J. STEPHENSON, *Primary Examiner.*